Patented Oct. 18, 1938

2,133,300

UNITED STATES PATENT OFFICE 2,133,300

COMPOSITIONS OF MATTER

Charles E. Linebarger and Charles E. Linebarger, Jr., Chicago, Ill., assignors to The Chaslyn Company, Chicago, Ill., a corporation of Illinois No Drawing. Application August 14, 1935, Serial No. 36,214

8 Claims. (Cl. 87—19)

This invention relates to new compositions of matter for use in the arts, particularly for the manufacture of hydrometric units employed as means of indicating the specific gravity or density of liquids. It has for its object the production of a solid composition that is insoluble in water and inert to aqueous solutions of acids, bases and salts, of medium strengths and not having powerful oxidizing properties, as well as alcohols, glycerine, glycol and similar substances, and compositions that can accordingly be used for articles which come in contact with such liquids. The nature of our new composition of matter is such that it can be melted into a homogeneous liquid and then cast into molds to form homogeneous solids. Furthermore, it is designed for the making of homogeneous hydrometric units known to the trade as Chaslyn balls, tablets, discs, or cartridges, which, when placed in a liquid, will sink or swim according as the densities of the units are greater or less than that of the liquid under test.

The Chaslyn hydrometric units have heretofore been formed from compositions of matter consisting substantially of fused mixtures of chlorinated naphthalenes having relatively high densities and melting points, and of various waxes or similar materials of lower densities and melting points, which are derived from natural sources. We have found, however, that these hydrometric units are improved, particularly as to highness of melting points, uniformity of texture and density, as well as to hardness and shrinkage, by making them wholly, or in much greater part than heretofore, with synthetic compounds due to the chemist's art rather than with natural materials of animal, vegetable or mineral origin.

In the present invention the materials may be selected from the numerous classes of the compounds of carbon, the choice depending upon certain qualities which the composition must have. Any pair of compatible organic compounds, which are insoluble in water and inert to aqueous solutions, have different densities, liquefy above 130° Fahrenheit, and one or both of which show an amorphous or cryptocrystalline structure, may be used to make a composition of matter more or less desirable for producing hydrometric units. However, as a rule, additional compounds must be added to the composition in order to improve the units.

By the word "compatible" herein we mean that the substances have complete mutual solubility with total absence of chemical action. The substances used in making our composition of matter are selected from a wide variety of organic chemicals belonging to both the aliphatic and the aromatic series, and to numerous classes, such as hydrocarbons and their halide and nitro derivatives, alcohols, esters, acids, amines, ketones, etc. All are compatible, forming true solutions and not suspensions or emulsions, and all maintain indefinitely the homogeneity of the composition both in the fused and in the solid state.

Organic chemicals having wax-like characteristics, obtainable commercially, are in numerous instances not definite compounds to which precise formulas and molecular weights can be assigned, but rather are mixtures of a plurality of chemical units. Thus. the chemical reaction between chlorine and naphthalene results in the production of a number of waxes consisting of mixtures in varying proportions of different naphthalene chlorides. Manufacturers of such synthetic materials can be depended upon, as a rule, to furnish different lots or samples under their trade names and numbers, of sufficient similarity of properties as to render them suitable for incorporating in hydrometric units.

A number of artificial or synthetic waxes has appeared on the market of which we have been unable to ascertain the chemical constitution and, are compelled therefore to refer to them by their trade names in lieu of chemical names. We have examined into the suitability of such synthetic waxes as we have been able to obtain for use in making hydrometric units, and have found that any of them which comply with the specifications set forth herein can be employed as ingredients or components in our new composition of matter.

Not every binary blend of a heavy and light component yields a composition of matter that is adapted to the successful manufacture of hydrometric units; the properties of grain, texture, hardness, strength, shrinkage, etc., need improving in most cases. We have found that the addition of one or more substances, even in small proportions, modifies profoundly the properties of the original binary blend. The use of these corrective or tempering materials we do not confine to waxes, either natural or synthetic, as we have discovered that certain crystalline chemicals are well adapted to this purpose. Each of these corrective substances exercises a specific action towards improving the binary blend, one conferring hardness, another giving strength, still another controlling shrinkage, etc. Indeed, some substances act in more than a single way in improving the hydrometric units. We, therefore, add to binary blends, if necessary, one or more compatible corrective materials to improve the composition for making hydrometric units.

Furthermore, many mixtures that are homogeneous when liquefied become heterogeneous on solidifying. This is mainly because the rates at which the various ingredients solidify may be different, with the result that the castings are not uniform and may contain voids or cracks. Only such combinations of heavy, light and corrective compounds or components can be used for making acceptable hydrometric units as has been found by trial to be free from the above mentioned faults and to possess homogeneity in every property. Sufficient corrective components are added to the blend of the heavy and light components, all in such proportions as to make certain that the uniformity of the multiple blend persists during the passage from the liquid to the solid state, and that the hydrometric units prepared therefrom have identical properties.

As corrective components we also use for special purposes, any gum-like substance of the nature of latex, rubber, chicle, duprene (artificial rubber), chlorinated rubber (tornesit), gutta percha, and any synthetic resin like Bakelite, etc., provided that they are compatible and impart desirable qualities to the composition.

We now describe the general method of preparing our composition of matter, using synthetic compounds suitable for hydrometric units, selecting materials for that purpose which are typical and illustrative of the process. However, the examples given are not to be construed as limiting our application in any way, such as in materials and the proportions thereof stated.

The heavy component selected is 50% chlorinated naphthalene, known in the trade as Halowax #1001, the density of which is 1.53 to 1.59, flow point 196° to 205° F.; and the light component is hydrogenated castor oil, commercially available under the trade names Opalwax or Rilan wax, specific gravity or density 0.98 to 1.0, flow point 171° to 178° F. Equal weights of these two components are melted together; the molten mixture is well stirred to insure perfect homogeneity, and it is then poured into suitable molds. The density of the resulting castings is 1.214 to 1.219 at 70°; and their flow point is 165° to 174° F.

An inspection of this binary blend showed that it was lacking in cohesive strength and did not possess sufficient shrinkage. To remedy these deficiencies we added to it 4.3% of meta-dinitrobenzene and 9.1% of stearyl alcohol, known in the trade as stenol. Castings of this quaternary composition had a density of 1.2050 to 1.2065 at 70°; and they showed other desirable characteristics such as rendered them well adapted for the manufacture of the hydrometric units. Blends consisting of the four materials cited, in the proportions as follows, are suitable: Halowax 43.3%, Opalwax 43.3%, dinitrobenzene 4.3%, and stearyl alcohol 9.1%. Such blends will have a density of a little over 1.2, the varying densities of the commercial ingredients being responsible for slight fluctuations in the density of the composition.

The density-correcting substance does not need to be one of the components of the composition. If it is desired to improve certain qualities in a composition, a substance known to produce the desired improvement can be used provided its density is appropriate, a two-fold advantage being gained thereby.

Certain pairs of compounds, as, for example, Halowax and Opalwax, and Halowax and stearyl alcohol, can form hydrometric compositions when combined in any proportion, the range of densities being from that of the one compound to that of the other. The quality of such compositions, however, varies with the proportions and usually needs to be improved through the addition of corrective components.

Hydrometric compositions can be prepared by different formulas and yet have the same densities, and compositions of the same components combined in different proportions have different densities. While the number of substances that can be mixed in varying proportions to form hydrometric units of different densities is large, yet the restrictions imposed by the conditions of formation and use of the units made therefrom reduce the number very much, for there are comparatively few materials which have the compatability, the relative solubility, the physical structure and properties in the solid state, the density, the melting point, the resistance to the action of physical solvents and chemical agents and the homogeneity demanded in the manufacture and application of such units.

We have found that the hardness of a composition is increased by incorporating therein small proportions of dinitrobenzene, or acetanilide. The shrinkage is affected by the use of carnauba wax, or stearyl alcohol, or similar carbon compounds. The strength is affected by the use of naphthalene, diphenylamine, or the like. The grain or texture is improved by adding montan wax or diphenyl. Fusibility is affected by adding benzamide. In each case these should be added in proportions of less than 10 percent.

Inasmuch as hydrometric units known to the trade as Chaslyn units, balls, tablets or discs are extensively used as charge indicators in storage batteries and accumulators, and inasmuch as the range of the densities of the sulphuric acid adopted in storage battery practice is 1.1 to 1.3, we have experimented extensively with mixtures of two synthetic waxes, which we refer to as the heavy and the light component, together with one or more carbon compounds, which we designate as corrective components, in order to ascertain what properties these substances must have in order to produce acceptable hydrometric units for batteries. As the result of this research we have learned that any combinations of synthetic waxes of different densities that are compatible and that will fuse together to form a true solution in which are freely soluble such carbon compounds as improve the quality and change the density of the whole mixture, so that castings can be made from it having densities ranging from 1.1 to 1.3, are adapted for manufacturing Chaslyn units, provided that the mixture is inert to sulphuric acid of the same range of densities.

Our composition is also adapted for making hydrometric units capable of testing the density of liquids used to lower the freezing point of solutions placed in automobile radiators. By employing in large measure components which, like hydrogenated castor oil, are but slightly soluble in alcohols, glycol, glycerine and other constituents of gasoline engine radiator liquors, the hydrometric units made from our compositions are not appreciably affected by any solvent action of the freezing preventatives or anti-freeze mixtures.

The foregoing descriptions and illustrations are not intended to impose any limits as to the scope and range of equivalency of the method, formula, or components set forth, or to their proportions. The names of components given are to be understood as standing as representatives for broad classes of chemical materials and are not to be considered as limiting in any way the present invention to the components mentioned.

To distinguish hydrometric units from one another, we make use of any suitable device such as adding to the blends when in molten condition preferred dyes or other soluble coloring materials, employing blend components having colors of their own, giving the units different shapes or sizes or casting or stamping them with a symbol such as a letter, word or other appropriate design.

We claim as our invention:

1. A composition of matter comprising 20 to 80 parts of hydrogenated castor oil, dissolved in 80 to 20 parts of melted chlorinated naphthalene.

2. A composition of matter as claimed in claim 1, including not more than ten parts of stearyl alcohol.

3. A composition of matter comprising 20 to 80 parts of hydrogenated castor oil, dissolved in 80 to 20 parts of melted chlorinated naphthalene, and including one to five parts of carnauba wax.

4. A composition of matter as claimed in claim 3, including not more than five parts of diphenylamine.

5. A composition of matter as claimed in claim 3, including not more than five parts of acetanilide.

6. A composition of matter comprising 20 to 80 parts of hydrogenated castor oil, dissolved in 80 to 20 parts of melted chlorinated naphthalene, and including one to five parts of montan wax.

7. A composition of matter as claimed in claim 6, and including one to five parts of dinitrobenzene.

8. A composition of matter as claimed in claim 6, and including one to five parts of benzamide.

CHARLES E. LINEBARGER.
CHARLES E. LINEBARGER, Jr.